United States Patent
Musumeci

(10) Patent No.: US 6,865,649 B2
(45) Date of Patent: Mar. 8, 2005

(54) METHOD AND APPARATUS FOR PRE-FETCHING DATA DURING PROGRAM EXECUTION

(75) Inventor: Gian-Paolo D. Musumeci, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 77 days.

(21) Appl. No.: 10/268,322

(22) Filed: Oct. 10, 2002

(65) Prior Publication Data

US 2004/0073752 A1 Apr. 15, 2004

(51) Int. Cl.[7] .............................................. G06F 12/00
(52) U.S. Cl. ...................... 711/137; 711/121; 711/146; 717/158; 712/240
(58) Field of Search ............................... 711/137, 146, 711/121; 712/240; 717/158, 153, 161

(56) References Cited

U.S. PATENT DOCUMENTS 5,212,794 A * 5/1993 Pettis et al. ................. 717/153
5,623,608 A * 4/1997 Ng ............................. 711/137
5,950,009 A * 9/1999 Bortnikov et al. .......... 717/158

* cited by examiner

Primary Examiner—Mano Padmanabhan
Assistant Examiner—Thang H Ho
(74) Attorney, Agent, or Firm—Park, Vaughan & Fleming LLP

(57) ABSTRACT

A system and method for pre-fetching data. A computer program comprising multiple basic blocks is submitted to a processor for execution. Tables or other data structures are associated with some or all of the basic blocks (e.g., a table is associated with, or stores, an instruction address of a particular basic block). During execution of a basic block, memory locations of data elements accessed during the executions are stored in the associated table. After a threshold number of executions, differences between memory locations of the data elements in successive executions are then computed. The differences are applied to the last stored memory locations to generate estimates of the locations for the data elements for a subsequent execution. Using the estimated locations, the data elements can be pre-fetched before, or as, the basic block is executed.

25 Claims, 2 Drawing Sheets

METHOD AND APPARATUS FOR PRE-FETCHING DATA DURING PROGRAM EXECUTION

BACKGROUND

This invention relates to the field of computer systems. More particularly, a system and methods are provided for pre-fetching data during execution of a program, and thereby increasing caching efficiency.

Caching is often used to make execution of a computer program faster and more efficient. In particular, because main memory (e.g., RAM) is slower than processor cache memory, and secondary memory (e.g., disk) is even slower than main memory, having necessary memory contents (e.g., instructions) in cache memory rather than main or secondary memory can allow those contents to be accessed and used faster.

The more applicable the principles of spatial locality and temporal locality are, the greater the benefits of caching. Temporal locality dictates that when a particular piece of information (e.g., data, instruction) is accessed, it is likely to be accessed again. Spatial locality dictates that when one piece of information is accessed, nearby information is likely to be accessed also.

A computer program may be logically divided into a series of basic blocks. A basic block is a set of one or more instructions, wherein all the instructions will be executed or none of them will be executed. In other words, once the path of execution of a program leads to the first instruction of a basic block, it is certain that all of the instructions in that basic block will be executed. According to the principles of spatial and temporal locality, when a particular basic block is executed, it is likely to be executed again, and execution of one basic block makes execution of another basic block likely (e.g., the subsequent block in the program).

Within a basic block, various data elements (e.g., variables, arrays, constants) may be read or written to. However, it cannot be assumed that each time a basic block is executed, the same memory location from which data was retrieved the last time will be accessed again. The actual memory locations corresponding to those data elements may vary between iterations of the basic block. For example, the index i of a data element $c[i]$ may be incremented each time a basic block is executed. Thus, memory locations pertaining to $c[i]$, then $c[i+1]$, $c[i+2]$, and so on are used in successive iterations.

Therefore, what is needed is a method and apparatus for facilitating the pre-fetching of data accessed in a basic block, that allow for variation in the memory locations corresponding to the data.

SUMMARY

In one embodiment of the invention, a system and methods are provided for facilitating the pre-fetching of data accessed in a computer program. A computer program comprising multiple basic blocks is submitted to a processor for execution. Tables or other data structures are associated with some or all of the basic blocks. For example, a table may be associated with, or store, an instruction address of a particular basic block.

During execution of a basic block, memory locations of data elements accessed during the executions are stored in the associated table. After a threshold number of executions (e.g., two), differences between memory locations of the data elements in successive executions are computed. The differences are applied to the last stored memory locations to generate estimates of the locations for the data elements for a subsequent execution. Using the estimated locations, the data elements can be pre-fetched before, or when, the basic block is executed.

In an embodiment of the invention, the tables are hardware tables within a processor. The processor associates separate tables with different basic blocks, perhaps the busiest, longest, or most memory-intensive blocks. In this embodiment, the compiler that compiles the program identifies or provides hints as to the boundaries of one or more basic blocks, and may indicate which basic blocks are most suitable for pre-fetching data (e.g., those with the most memory accesses or most instructions).

DETAILED DESCRIPTION

Figure 1:
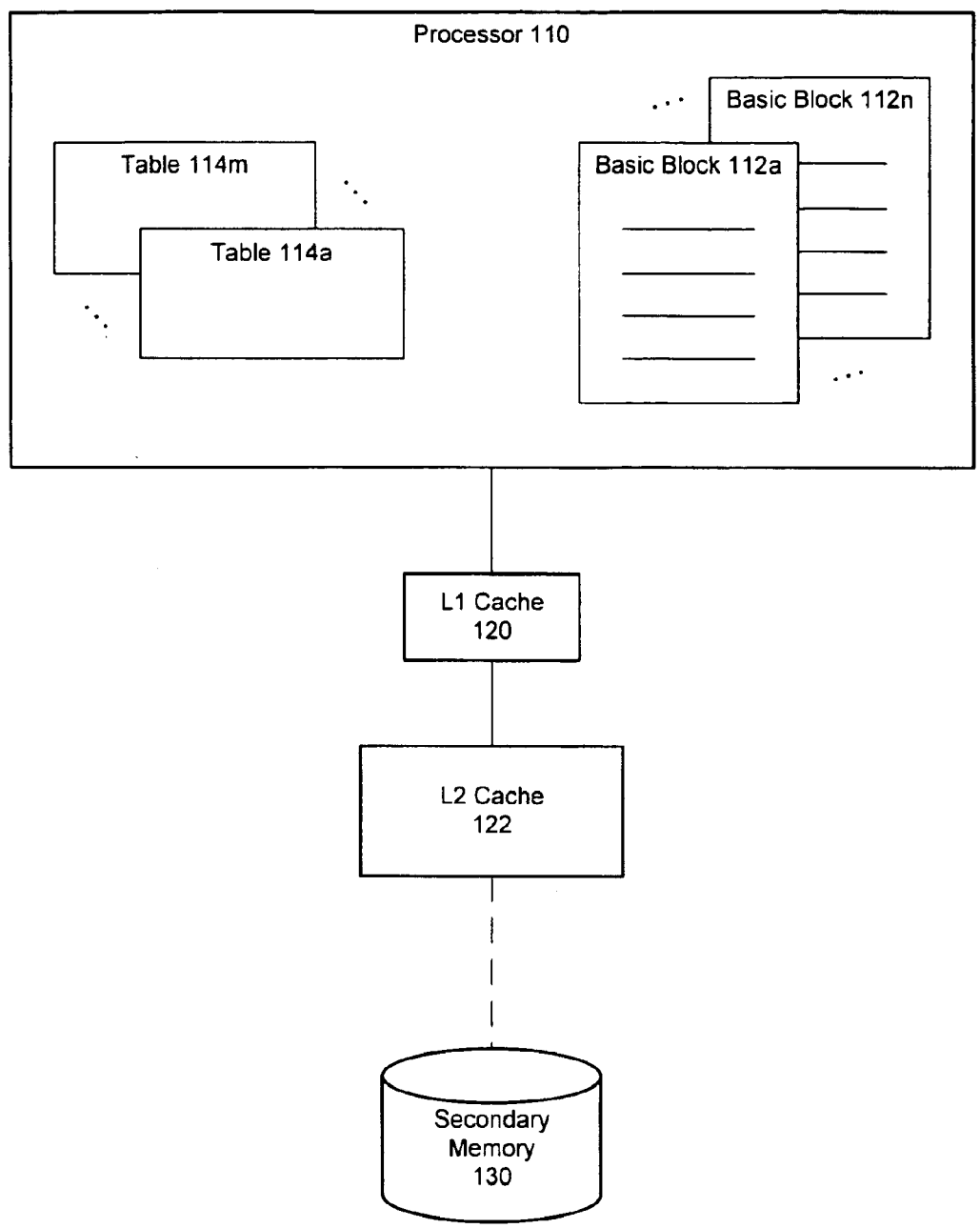
FIG. 1 is a block diagram depicting a computer system for pre-fetching data during execution of a computer program, according to one embodiment of the invention.

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

The program environment in which a present embodiment of the invention is executed illustratively incorporates a general-purpose computer or a special purpose device such as a hand-held computer. Details of such devices (e.g., processor, memory, data storage, display) may be omitted for the sake of clarity.

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM) and/or non-volatile (e.g., ROM, disk) memory, carrier waves and transmission media (e.g., copper wire, coaxial cable, fiber optic media). Exemplary carrier waves may take the form of electrical, electromagnetic or optical signals conveying digital data streams along a local network, a publicly accessible network such as the Internet or some other communication link.

In one embodiment of the invention, a method and apparatus are provided for facilitating the pre-fetching of data accessed during execution of a basic block of a computer program. In this embodiment, the compiler that compiles the program is configured to identify or mark basic blocks of execution within the program. Each basic block comprises one or more instructions, and whenever one instruction in a basic block is executed, all of them are executed. Illustratively, the compiler may identify, in the object code it produces, the beginning and/or end of a basic block. Or, the compiler may provide "hints" regarding the boundaries of one or more basic blocks.

The compiler may identify all basic blocks in a program, or some subset of all the basic blocks. For example, the compiler may identify the N most complicated or lengthy basic blocks. These may be the blocks that contain the most instructions, the most memory (e.g., data) accesses, the most complicated (e.g., slowest) instructions, etc.

In an alternative embodiment of the invention, the processor (or other hardware component) could determine, during execution of a program, which basic blocks are most suitable for optimization.

A processor for executing the program is configured with M tables, arrays or other structures for tracking data accesses in some or all of the N basic blocks. M may be greater than, less than or equal to N. As described in more detail below, each table stores the memory location(s) (e.g., addresses, pointers) of one or more data elements accessed in the corresponding basic block. After the basic block has been executed a threshold number of times (e.g., two), the stored information can be used to predict the memory locations that will be accessed during the next iteration. Then, before the next iteration, or as the next iteration begins, those locations may be pre-fetched, thereby making the data quickly available.

FIG. 1 depicts computer system 102 as it may be configured to implement an embodiment of the invention. Computer system 102 includes processor 110, L1 cache 120, L2 cache 122 and secondary memory (e.g., disk storage) 130. Any number of additional caches may be interposed between L2 cache 122 and secondary memory 130. As one skilled in the art will recognize, data and instructions may be retrieved from relatively slow storage (e.g., L2 cache 122, secondary memory 130) and stored or cached in faster memory (e.g., L1 cache 120, L2 cache 122).

Processor 110 is configured to execute a computer program comprising any number of basic blocks. A compiler that compiles the program may identify or mark N basic blocks, depicted as basic blocks 112a–112n. Processor 110 is also configured with M tables (tables 114a–114m) for tracking data accesses within basic blocks.

During execution of a basic block, processor 110 updates a corresponding table, if a table has been associated with the basic block, and may access one or more caches (e.g., 120, 122) and/or secondary memory to retrieve or store data. In the illustrated embodiment of the invention, tables 114a–114m are hardware tables. In other embodiments of the invention, tables or other suitable data structures may be implemented in software or a processor or system cache.

In one embodiment of the invention, a table for tracking data accesses within a basic block is configured to store the start address of the basic block. This allows ready determination of whether any table corresponds to a particular basic block, and easy identification of which table corresponds to which basic block. A table also includes at least three entries (e.g., cells) for each basic block data element that is being monitored for pre-fetching.

To demonstrate an illustrative table configuration for an embodiment of the invention, the following sample code is employed:

```
For (i = 0; i < MAX; i++)           Instruction 1
{
    a = x + (y^z)                    Instruction 2
    b = z^y + (a mod z)              Instruction 3
    c[i] += a/b                      Instruction 4
}
```

In this example, as one of ordinary skill in the art may perceive, instruction 1 may comprise one basic block, while instructions 2–4 comprise another. The basic block comprising instructions 2–4 is of interest for illustrating an embodiment of the invention. This basic block involves six separate data elements: a, b, $c[i]$, x, y and z.

TABLE 1 illustrates the form of a table for tracking the data accesses of this basic block, to facilitate data pre-fetching, according to one embodiment of the invention. The asterisk ("*") symbol is used to indicate or denote an address of, or pointer to, a data element. For example, *x can be interpreted as the address of variable x.

TABLE 1

| Start address of basic block | *x | *y | *z | *a | *b | *c[i] |
|---|---|---|---|---|---|---|
|  | *x | *y | *z | *a | *b | *c[i+1] |
|  | 0 | 0 | 0 | 0 | 0 | 4 |

In this embodiment, a table for tracking data accesses includes the start address of the associated basic block, plus three cells for each data element that may be pre-fetched. In TABLE 1, the top row of cells for each data element is used to store the address of the corresponding data element during one pass through (i.e., execution of) the basic block. The second row stores the addresses of the data elements during another pass, and the bottom row is used to store the differences between the addresses of the data elements during the previous two passes. A basic block's table may include some or all of the data elements accessed during execution of the basic block.

Each time a new basic block is encountered during program execution, the processor may compare the starting address of the block against the addresses stored in valid tables. After a table is associated with a basic block, each time the basic block is executed, memory transactions involving data elements are recorded in the table. In particular, the addresses from which the data elements are read from or written to are recorded, as described above.

Thus, in TABLE 1, for each of data elements x, y, z, a and b, the same addresses are used in two successive iterations of the basic block. However, the addresses of the successive accesses to cells of array c (i.e., for $c[i]$ and $c[i+1]$) differ by the size of the array cell—in this example, four (e.g., a double word).

In this embodiment of the invention, after two successive iterations of the basic block, the indicated differences can be applied to the last address used for a data element to pre-fetch the data element before or during the next iteration. For example, when it is likely that the example basic block is to be executed again (e.g., the preceding basic block begins executing), the data elements of the example basic block may be pre-fetched. Or, soon after the example basic block begins executing, all the data elements may be retrieved.

In different embodiments of the invention, a slightly different method or apparatus may be employed. For example, before allowing the pre-fetching of data elements, at least three or more iterations of a basic block may be required, so that the difference between the first two addresses used to access a data element may be compared against the difference between two subsequent addresses used to access the same data element. If they match, higher confidence can be placed in the retrieval of the correct data.

Also, a table for tracking basic block data accesses and facilitating data pre-fetching may be configured for any number of data elements (e.g., eight). And, as described above, any number of tables may be employed (e.g., sixteen).

Associated information or data structures may accompany a table for tracking basic block data accesses and facilitating data pre-fetching, including validity indicators, status indicators, and so on. For example, status indicators may be used to reflect the status of a table (e.g., to indicate whether it is tracking a first pass through a basic block, a second pass, a third or higher pass). Validity indicators may be used to indicate that the differences calculated and stored in a table are valid (i.e., can be used for pre-fetching data). Another indicator for a table may reflect whether the instructions comprising the associated basic block are currently cached, which row of cells should be populated the next time the associated basic block is executed, etc.

After two rows of addresses in a table are populated during two successive iterations of the associated basic block, in subsequent iterations either row may be overwritten. Illustratively, the differences placed in the bottom row of TABLE 1 will reflect the difference between the data element memory locations used in the preceding two iterations, regardless of which of the top two rows was last updated.

Figure 2:
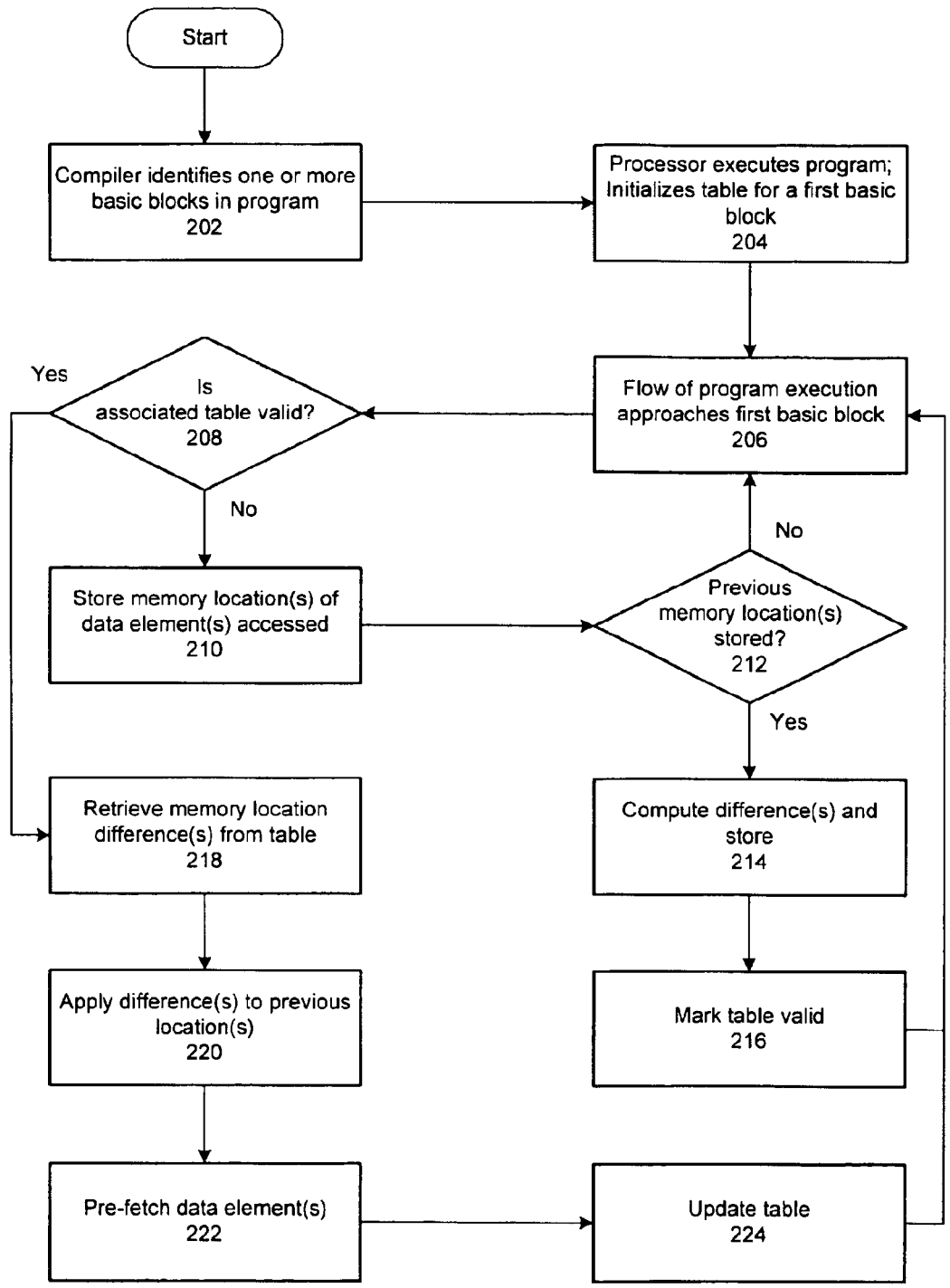
FIG. 2 is a flowchart illustrating one method of pre-fetching data during execution of a computer program, according to one embodiment of the invention.

FIG. 2 is a flowchart demonstrating a method of facilitating the pre-fetching of data elements accessed during a basic block, according to one embodiment of the invention.

In operation 202, a compiler compiles a computer program and identifies or hints at boundaries between N basic blocks of the program. The compiler includes such hints in the generated object code, and may identify the most complicated, longest, or most memory-intensive basic blocks.

In operation 204, a processor called upon to execute the program initializes a table for facilitating the pre-fetching of one or more data elements accessed within a first basic block. As part of the initialization, the starting address or a label of the first basic block is associated with the table. Illustratively, the address may be stored as part of the table, or in a separate structure.

In operation 206, the flow of program execution approaches the first basic block. For example, a basic block that precedes the first basic block in a predicted branch of execution may begin execution. Or, the first basic block itself may be reached.

In operation 208, the processor determines whether the table associated with the first basic block is valid. In this embodiment, a table is considered valid when it is currently being used to track data element access in a basic block and a sufficient number of data accesses have been monitored to allow the prediction of the memory location to be used for a subsequent access. In one implementation of this embodiment, the table may be deemed valid after two iterations of the basic block, which is a sufficient number to allow the calculation of differences between the memory locations accessed during those iterations.

If the table is valid, the illustrated method advances to operation 218; otherwise, the method continues with operation 210.

In operation 210, during or after the first basic block is executed, memory locations (e.g., addresses) of one or more data elements accessed during the execution are stored in the table. Illustratively, two (or more) rows of the tables may be allocated to storing such locations, and may be used in round-robin fashion during successive executions of the first basic block.

In operation 212, the processor determines whether any previous memory locations for the data elements have been stored. If so, the method advances to operation 214. Otherwise, the processor cannot yet compute any differences, and therefore returns to operation 206.

In operation 214, differences are calculated between the current memory locations and a previously stored set of locations for one or more data elements accessed during execution of the first basic block. In this embodiment of the invention, the differences are stored for rapid retrieval and use during a subsequent iteration of the basic block. In one alternative embodiment, differences are not computed until the subsequent iteration, at which time they may be immediately applied to pre-fetch the data elements.

In operation 216, the table is marked valid, because its contents can now be used to enable pre-fetching of data elements in the next iteration of the first basic block. The method then returns to operation 206.

In operation 218, execution of the first basic block may be approaching (e.g., if branch prediction is correct), or has commenced, and the associated processor table is valid. Therefore, the processor retrieves calculated memory location (e.g., address) differences from the table for one or more data elements accessed during execution of the block.

In operation 220, the differences are applied to the last stored set of memory locations, in order to predict the current locations of the data element(s).

In operation 222, the predicted current locations are used to pre-fetch the data elements, thereby making them all available before the first basic block even begins executing, or shortly thereafter.

The method illustrated in FIG. 2 may end at various points. For example, the program may halt during operation 206 before it reaches the first basic block again.

The foregoing embodiments of the invention have been presented for purposes of illustration and description only. They are not intended to be exhaustive or to limit the invention to the forms disclosed. Accordingly, the scope of the invention is defined by the appended claims, not the preceding disclosure.

What is claimed is:

1. A method of facilitating the pre-fetching of data during execution of a computer program, comprising:

receiving at a processor a set of instructions to be executed, said set including one or more basic blocks;

during each of a threshold number of executions of a first basic block, recording memory locations of one or more data elements accessed during said execution of said first basic block, wherein said recording a memory location of a data element comprises:

storing an address of said data element in a table associated with said first basic block, and after said threshold number of executions of said first basic block, marking said table valid to indicate that said one or more data elements may be pre-fetched;

for each said data element, calculating a difference between said recorded memory locations for successive executions of said first basic block; and pre-fetching said one or more data elements for a subsequent execution of said first basic block.

2. The method of claim 1, wherein said pre-fetching comprises caching said one or more data elements.

3. The method of claim 1, wherein said pre-fetching comprises:
   prior to said subsequent execution of said first basic block, retrieving said differences;
   applying said differences to the most recent of said recorded memory locations to generate estimated memory locations; and
   retrieving the contents of said estimated memory locations.

4. The method of claim 1, wherein said pre-fetching comprises:
   during said subsequent execution of said first basic block, retrieving said differences;
   applying said differences to the most recent of said recorded memory locations to generate estimated memory locations; and
   retrieving the contents of said estimated memory locations.

5. The method of claim 1, wherein said receiving comprises:
   receiving object code generated by a compiler;
   wherein said object code identifies said one or more basic blocks.

6. The method of claim 1, wherein said receiving comprises:
   compiling source code to produce object code; and
   within said object code, identifying said one or more basic blocks.

7. The method of claim 1, further comprising, prior to said recording a memory location:
   associated with said table an instruction address of said first basic block.

8. A computer readable storage medium storing instructions that, when executed by a computer, cause the computer to perform a method of facilitating the pre-fetching of data during execution of a computer program, the method comprising:
   receiving at a processor a set of instructions to be executed, said set including one or more basic blocks;
   during each of a threshold number of executions of a first basic block, recording memory locations of one or more data elements accessed during said execution of said first basic block, wherein said recording a memory location of a data element comprises:
      storing an address of said data element in a table associated with said first basic block, and
      after said threshold number of executions of said first basic block, marking said table valid to indicate that said one or more data elements may be pre-fetched;
   for each said data element, calculating a difference between said recorded memory locations for successive executions of said first basic block; and
   pre-fetching said one or more data elements for a subsequent execution of said first basic block.

9. A method of pre-fetching data accessed during execution of a basic block of a computer program, comprising:
   receiving object code for execution by a processor, wherein said object code comprises one or more basic blocks;
   initializing a table for tracking access to one or more data elements during execution of a first of said basic blocks;
   during a first execution of said first basic block, storing in said table, for each of said data elements, a first memory location of said data element;
   during a second execution of said first basic block, storing in said table, for each of said data elements, a second memory location of said data element; and
   for each said data element:
      calculating a difference between said first memory location and said second memory location;
      applying said difference to said second memory location to generate an estimated location;
      pre-fetching said data element, from said estimated location, for a third execution of said first basic block; and
   after a threshold number of executions of said first basic block, marking said table valid to indicate that said one or more data elements may be pre-fetched.

10. The method of claim 9, further comprising:
    compiling source code to produce said object code; and
    indicating in said object code boundaries of said one or more basic blocks.

11. The method of claim 9, wherein said initializing comprises:
    associating with said table an instruction address of said first basic block.

12. The method of claim 9, wherein said storing a memory location of a data element comprises:
    storing an address in memory of said data element.

13. The method of claim 9, further comprising:
    for each of said data elements, storing said difference between said first memory location and said second memory location.

14. The method of claim 13, wherein said difference is stored in said table.

15. The method of claim 9, wherein said calculating, applying and pre-fetching axe performed prior to said third execution of said first basic block.

16. The method of claim 9, wherein said calculating, applying and pre-fetching are performed at the initiation of said third execution of said first basic block.

17. The method of claim 9, wherein said calculating is performed during said second execution of said first basic block.

18. A computer readable storage medium storing instructions that, when executed by a computer, cause the computer to perform a method of pre-fetching data accessed during execution of a basic block of a computer program, the method comprising:
    receiving object code for execution by a processor, wherein said object code comprises one or more basic blocks;
    initializing a table for tracking access to one or more data elements during execution of a first of said basic blocks;
    during a first execution of said first basic block, storing in said table, for each of said data elements, a first memory location of said data element;
    during a second execution of said first basic block, storing in said table, for each of said data elements, a second memory location of said data element; and
    for each said data element:
    calculating a difference between said first memory location and said second memory location;
    applying said difference to said second memory location to generate an estimated location;

pre-fetching said data element, from said estimated location, for a third execution of said first basic block; and after a threshold number of executions of said first basic block, marking said table valid to indicate that said one or more data elements may be pre-fetched.

19. A computer readable storage medium containing a data structure configured for facilitating pre-fetching of data elements accessed during execution of a basic block of a computer program, the data structure comprising:

for each of said data elements, a first memory location of said data element during a first execution of said basic block; and for each of said data elements, a second memory location of said data element during a second execution of said basic block;

wherein after a threshold number of executions of said basic block, a marking element to mark said data element valid to indicate that said one or more memory location may be pre-fetched.

20. The computer readable storage medium of claim 19, wherein said data structure further comprises:

for each of said data elements, a difference between said first memory location and said second memory location;

wherein said difference may be applied to said second memory location to generate an estimated location from which said data element may be pre-fetched for a third execution of said basic block.

21. The computer readable storage medium of claim 19, wherein said data structure further comprises:

an instruction address of said basic block.

22. An apparatus for facilitating the pre-fetching of data elements accessed during execution of a computer program, comprising:

a computer program comprising one or more basic blocks;

a data structure configured to store memory locations of a set of data elements accessed during execution of a first basic block of the computer program; and a processor configured to:

determine differences between memory locations of said data elements between successive executions of the first basic block;

apply said differences to estimate locations of said data elements for a subsequent execution of the first basic block;

pre-fetch said data elements for said subsequent execution; and mark said data structure valid to indicate that said one or more memory locations may be pre-fetched, after a threshold number of executions of said first basic block.

23. The apparatus of claim 22, wherein said data structure is further configured to store an instruction address of the first basic block.

24. The apparatus of claim 22, wherein said processor comprises said data structure.

25. The apparatus of claim 22, further comprising:

a compiler configured to generate the computer program as a set of object code from a set of source code;

wherein said compiler indicates, in the computer program, boundaries of said one or more basic blocks.

* * * * *

UNITED STATES PATENT AND TRADEMARK OFFICE
CERTIFICATE OF CORRECTION

PATENT NO. : 6,865,649 B2
DATED : March 8, 2005
INVENTOR(S) : Gian-Paolo D. Musumeci It is certified that error appears in the above-identified patent and that said Letters Patent is hereby corrected as shown below:

<u>Column 8,</u>
Line 37, please delete the word, "axe" and replace with the word -- are --.

Signed and Sealed this

Seventeenth Day of May, 2005

JON W. DUDAS
*Director of the United States Patent and Trademark Office*